United States Patent [19]

Barlow et al.

[11] 4,324,771

[45] Apr. 13, 1982

[54] ALCOHOL & HYDROXYOXIME EXTRACTANT FOR BORON & CALCIUM FROM BRINES

[75] Inventors: Ernest W. Barlow, Stansbury Park; Ramaswami Neelameggham, Salt Lake City, both of Utah

[73] Assignee: Amax Inc., Greenwich, Conn.

[21] Appl. No.: 162,335

[22] Filed: Jun. 23, 1980

[51] Int. Cl.[3] ........................ B01D 11/01; C01B 35/10

[52] U.S. Cl. .................................... 423/283; 423/157; 423/279; 423/DIG. 14; 210/634

[58] Field of Search ............... 423/276, 279, 283, 298, 423/181, 157, DIG. 14; 210/21, 634

[56] References Cited

U.S. PATENT DOCUMENTS

| | | | |
|---|---|---|---|
| 3,111,383 | 4/1963 | Garrett et al. | 423/283 |
| 3,424,563 | 1/1969 | Grinstead | 423/276 |
| 3,741,731 | 6/1973 | Peterson | 423/181 X |
| 3,812,238 | 5/1974 | Grannen | 423/283 |

*Primary Examiner*—G. O. Peters

*Attorney, Agent, or Firm*—Michael A. Ciomek; Roland T. Bryan

[57] ABSTRACT

Boron and calcium are removed from brines with use of a mixture of from about 0.8 to 15 volume percent of an $\alpha$-hydroxy oxime extractant having the general formula:

$$R-\overset{\displaystyle OH}{\underset{\displaystyle R''}{\overset{|}{\underset{|}{C}}}}-\overset{\displaystyle NOH}{\overset{\|}{C}}-R'$$

where R and R' are hydrocarbon radicals and R'' is hydrogen or a hydrocarbon radical, from 0 to 10 volume percent of a 7 to 12 carbon alcohol, balance diluent.

8 Claims, No Drawings

ALCOHOL & HYDROXYOXIME EXTRACTANT FOR BORON & CALCIUM FROM BRINES

The present invention relates to a process for boron and calcium removal from brines with use of a mixture containing from about 0.8 to 15 volume percent of an α-hydroxy oxime extractant having the general formula:

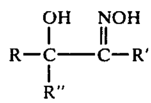

where R and R' are hydrocarbon radicals and R" is hydrogen or a hydrocarbon radical, from 0 to 10 volume percent of a 7 to 12 carbon alcohol, balance diluent.

In the extraction of boron from brines, conventional techniques dictate use of acidifying the brines which will have to be re-neutralized with an alkali before further processing. The present invention avoids the use of costly additions of acid and alkali by enabling the extraction to take place from unacidified brines. Simultaneous removal of calcium along with boron improves the salt balance in the brine for subsequent electrolytic processing.

The extraction of boron from brines heretofore has required acidifying the brines which then requires re-neutralization with an alkali material prior to further processing of the brine. Exemplary of such prior extractive systems is U.S. Pat. No. 3,855,392. In addition, U.S. Pat. Nos. 3,433,604 and 3,424,563 extract boron from magnesium chloride brines with the use of organic extractants different than that of this invention. This invention utilizes chelation of boron between the hydroxy (—OH) and the oxime (=NOH) groups rather than between the hydroxy groups on adjacent carbon atoms. Low solubility losses are encountered.

The extractant used in this invention is fully disclosed in U.S. Pat. No. 3,224,873 which patent is incorporated herein for such purpose.

The α-hydroxy oxime extractants used in the present invention have the following general formula:

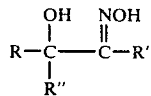

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same and when alkyl are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxy-hexatriaconta-9,27-dien-18-oxime, 5-10 diethyl 8-hydroxytetradecan-7-oxime, and 5,8-diethyl-7-hydroxydodecane6-oxime.. The latter compound has the following structural formula:

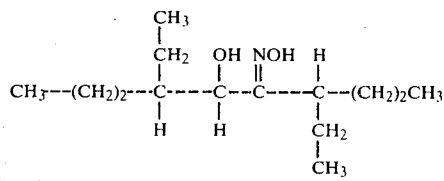

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime extractants are also characterized as having a solubility of at least 2% by weight in the hydrocarbon solvent used to make up the organic phase and substantially complete insolubility in water.

The α-hydroxy oxime extractant is included in the boron extraction mixture in amounts ranging from about 0.8 to 15 volume percent. It is preferred to include the α-hydroxy oxime in amounts from about 3 to 10 volume percent, the lower value ensures reaction with the boron or other element such as calcium, while the upper limit is selected on the basis of economic considerations.

However, it will be understood that the amount included is a function of the amount of boron and/or calcium desired to be removed from the brine. Typically, sodium or magnesium chloride brines containing about 370 to 500 ppm boron and from 0.6 wt% to 2.0 wt% calcium are suitable for treatment in accordance with this invention. Following treatment, essentially all of the boron is removed and calcium lowered to 0.04 wt% to 1.5 wt.%. The incoming magnesium chloride brines typically have a pH from 1-7 and are composed of about 27 to 40 wt.% $MgCl_2$.

The mixture may also optionally include up to 10 volume percent of a 7 to 12 carbon atom alcohol for purposes of enhancing boron and calcium removal efficiency. Typically from about 1 to 10 volume percent may be utilized with from 3 to 5 volume percent being preferred for reasons of facilitating removal on the lower end of the range to economics on the upper level. The aliphatic alcohol disclosed in U.S. Pat. No. 3,855,392 may be used in the practice of the invention. The disclosure of such patent is incorporated herein for purposes of fully describing such alcohols. The iso-octanol form of such alcohols is preferred although the iso-decanol form is also suitable.

The balance of the extractant mixture is a suitable diluent, such as kerosene.

The extraction process may be performed with use of conventional extraction equipment such as a mixer-settler.

An example of the invention is as follows. A magnesium chloride brine containing 31.5 wt% $MgCl_2$, 0.12 wt% calcium and 500 ppm boron at a pH of 4.0 was contacted with a mixture containing 4 volume percent of the extractant discussed above, 4 volume percent iso-octanol alcohol balance low aromatic kerosene in a four-stage counter current mixer-settler the resultant product contained 31.5 wt.% $MgCl_2$, 0.06 wt% calcium, and 5 ppm boron with a pH of 3.9 (as measured on undiluted brine solution).

The following Table illustrates various distribution coefficients ($E_o$) utilizing various combinations of α-hydroxy oxime and iso-octanol in kerosene for brines of the above discussed composition.

TABLE

| Isooctanol (Vol. %) | α-hydroxy oxime (Vol. %) | $E_o$* |
|---|---|---|
| 2 | 4 | 2.3 |
| 4 | 4 | 2.6 |
| 6 | 4 | 3.3 |
| 8 | 4 | 3.3 |
| 10 | 4 | 3.0 |
| 0 | 3.2 | 0.4 |
| 2 | 3.2 | 0.7 |
| 4 | 3.2 | 1.8 |
| 6 | 3.2 | 1.9 |
| 8 | 3.2 | 2.0 |
| 10 | 3.2 | 1.9 |
| 4 | 2.4 | 1.1 |
| 6 | 2.4 | 1.0 |
| 8 | 2.4 | 1.3 |
| 10 | 2.4 | 1.2 |
| 4 | 1.6 | 0.5 |
| 6 | 1.6 | 0.7 |
| 10 | 1.6 | 0.7 |
| 4 | 0.8 | 0.5 |
| 6 | 0.8 | 0.4 |
| 10 | 0.8 | 0.2 |

*increasing $E_o$ values indicate increasing efficiency of boron removal

We claim:

1. A process for extracting boron from brines, comprising:
   providing a brine containing boron, contacting the brine with a water-insoluble organic extractant consisting of from 0.8 to 15 volume percent of an α-hydroxy oxime extractant having the general formula:

$$R-\overset{\overset{\displaystyle OH}{|}}{\underset{\underset{\displaystyle R''}{|}}{C}}-\overset{\overset{\displaystyle NOH}{\|}}{C}-R'$$

where R and R' are hydrocarbon radicals and R'' is selected from the group consisting of hydrogen and organic hydrocarbon radicals, from 0 to 10 volume percent of a 7 to 12 carbon alcohol, balance essentially diluent to said brine to extract boron from the brine.

2. The process of claim 1, wherein said diluent is kerosene.

3. The process of claims 1 or 2, wherein said alcohol is present in volume percentages ranging from about 1 to 10.

4. The process of claims 1 or 2, wherein:
   said brine also contains calcium and said calcium is also extracted during the process.

5. The process of claims 1 or 2, wherein:
   said brine is a magnesium brine.

6. The process of claims 1 or 2, wherein:
   said α-hydroxy oxime extractant is present in volume percentages ranging from about 3 to 10.

7. The process of claims 1 or 2, wherein:
   said alcohol is present in volume percentages ranging from about 3 to 5.

8. The process of claims 1 or 2, wherein:
   said brine is a magnesium brine; said α-hdyroxy oxime extractant is present in volume percentages ranging from about 3 to 10; and said alcohol is present in volume percentages ranging from about 3 to 5.

* * * * *